United States Patent
Imano (10) Patent No.: US 10,060,094 B2
(45) Date of Patent: Aug. 28, 2018

(54) ARRANGEMENT STRUCTURE FOR A REDUCING AGENT TANK FOR A CONSTRUCTION MACHINE

(71) Applicant: Caterpillar SARL, Geneva (CH)

(72) Inventor: Toru Imano, Tokyo (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 15/534,684

(22) PCT Filed: Dec. 8, 2015

(86) PCT No.: PCT/EP2015/079037
§ 371 (c)(1),
(2) Date: Jun. 9, 2017

(87) PCT Pub. No.: WO2016/096546
PCT Pub. Date: Jun. 23, 2016

(65) Prior Publication Data
US 2017/0335544 A1    Nov. 23, 2017

(30) Foreign Application Priority Data

Dec. 15, 2014   (JP) ................................. 2014-253071

(51) Int. Cl.
| | |
|---|---|
| *B60K 13/04* | (2006.01) |
| *E02F 9/08* | (2006.01) |
| *E02F 3/32* | (2006.01) |
| *F01N 3/28* | (2006.01) |
| *F01N 3/20* | (2006.01) |

(52) U.S. Cl.
CPC ............ *E02F 9/0883* (2013.01); *B60K 13/04* (2013.01); *E02F 3/32* (2013.01); *F01N 3/2896* (2013.01); *B60Y 2200/412* (2013.01); *F01N 3/2066* (2013.01); *F01N 2610/02* (2013.01)

(58) Field of Classification Search
CPC ........ B60K 13/04; B60K 15/063; Y02T 10/24
See application file for complete search history.

(56) References Cited

U.S. PATENT DOCUMENTS

| | | | |
|---|---|---|---|
| 2016/0265192 A1* | 9/2016 | Kanou | E02F 9/18 |
| 2016/0273190 A1* | 9/2016 | Doi | E02F 9/18 |
| 2016/0281326 A1* | 9/2016 | Ozaki | E02F 9/0866 |
| 2016/0281327 A1* | 9/2016 | Hashimoto | E02F 9/18 |
| 2017/0241316 A1* | 8/2017 | Suparman | F01N 3/2066 |

FOREIGN PATENT DOCUMENTS

EP          2226478 A1    9/2010

* cited by examiner

*Primary Examiner* — Bryan A Evans (57) ABSTRACT

To control elevation of the temperature of the reducing agent in a reducing agent tank which is located near a heat generating control valve in a construction machine, a tank storage room 8 housing a urea aqueous tank is located at the upper side of a valve housing room where control valves are housed. The urea aqueous tank is mounted at the upper side of a bulkhead plate which separates a tank storage room and the valve housing room one above the other having an empty space between so that air can flows through an air flow path S, and a space A is provided between a cover body covering the tank storage room and a cover body covering the valve housing room so that the air flows in and out through the space A and the air flow path S.

5 Claims, 11 Drawing Sheets

ARRANGEMENT STRUCTURE FOR A REDUCING AGENT TANK FOR A CONSTRUCTION MACHINE

CROSS-REFERENCE TO RELATED APPLICATIONS

This application is a national phase application of International Patent Application No. PCT/EP15/79037 filed Dec. 8, 2015, which claims priority to Japanese Patent Application No. 2014-253071 filed Dec. 15, 2014, both of which are incorporated by reference herein in their entireties for all purposes.

TECHNICAL FIELD

The present invention relates to the technical field of an arrangement structure of a reducing agent tank that stores a reducing agent used in an exhaust gas purifying device in a construction machine such as a hydraulic shovel.

BACKGROUND ART

Generally, in a construction machine such as a hydraulic shovel, an engine (particularly diesel engine) is widely employed as a power source. However, exhaust gas discharged from an engine contains a large amount of nitrogen oxide (NOx). Thus, conventionally, various exhaust gas purifying devices for removing nitrogen oxide within and purifying exhaust gas have been put into practical use. As an example of such exhaust gas purifying device, one in which a reducing agent such as urea water is injected into an exhaust gas path of an engine to reduce nitrogen oxide has been known. In the case of employing the exhaust gas purifying device using the reducing agent, a reducing agent tank for storing the reducing agent such as urea water is mounted on a machine body.

Upon mounting the reducing agent tank to the machine body, the reducing agent needs to be supplied appropriately to the reducing agent tank. Therefore, accessibility upon supply is required, and as great an increase as possible in the capacity of the reducing agent tank is required in order to decrease the number of supplies. However, many instruments and devices are mounted on a construction machine such as a hydraulic shovel, and it is difficult to ensure additional space for the reducing agent tank.

Thus, conventionally, a configuration in which a control valve controlling the operation of a hydraulic actuator and the reducing agent tank are both arranged in an instrument accommodating chamber provided on the front section of an upper slewing body of a hydraulic shovel (see PTL 1) has been known. Also, a configuration in which a control valve and a reducing agent tank are arranged together in an instrument chamber provided on the front section of an upper slewing body of a hydraulic shovel and in which intake and exhaust openings and a fan for intake and exhaust are provided in the same instrument chamber (e.g., see PTL 2) has been proposed.

CITATION LIST

Patent Literature

[PTL 1]
Japanese Patent Application Laid-open No. 2013-2082
[PTL 2]
Japanese Patent Application Laid-open No. 2011-64134

SUMMARY OF INVENTION

Technical Problem

A reducing agent such as urea water easily degrades in performance under a high-temperature environment. Therefore, when a reducing agent tank is arranged in an instrument accommodating chamber together with a control valve that is a heat generating instrument as in PTL 1 described above, there is a risk of inviting performance degradation due to the reducing agent being heated by heat generation of the control valve, particularly during summer or in a tropical area.

In contrast, in PTL 2, the intake and exhaust openings and the fan are provided in the instrument chamber, so as to suppress a temperature increase of the reducing agent tank by forced ventilation of the instrument chamber with the fan. Herein, however, the intake opening is provided on a floor of the instrument chamber in a state of being covered by a fuel tank from above with an interval therebetween, while the reducing agent tank is installed on the upper surface in a low position of a step shape formed in the front-half portion of the fuel tank. The control valve is arranged in the front of the reducing agent tank, and the fan and the exhaust opening are arranged between and to the left of the control valve and the reducing agent tank relative to a front-back direction. External air taken in from the intake opening passes through below the fuel tank and heads to the exhaust opening. With this flow of external air, transfer of heat from the control valve to the reducing agent tank cannot be blocked effectively. Moreover, the fan is necessary in order to generate the flow of the external air, and the number of parts increases disadvantageously; hereleis the problem to be solved by the present invention.

Solution to Problem

The present invention has been created for the purpose of solving these problems in view of the circumstances as described above. An invention of claim 1 is an arrangement structure of a reducing agent tank in a construction machine, the construction machine being mounted with an engine, an exhaust gas purifying device provided on an exhaust gas path of the engine, a reducing agent tank that stores a reducing agent used in the exhaust gas purifying device, a hydraulic actuator, and a control valve that controls an operation of the hydraulic actuator, wherein a tank accommodating chamber accommodating the reducing agent tank is provided above a valve accommodating chamber accommodating the control valve, the reducing agent tank is arranged above a partition plate that separates the tank accommodating chamber and the valve accommodating chamber above and below in a state where airspace as an air flow passage exists in an interval between the reducing agent tank and the partition plate, and a gap as an inflow-outflow opening for external air to pass through the air flow passage is provided vertically between a cover body covering the tank accommodating chamber and a cover body covering the valve accommodating chamber.

An invention of claim 2 is an arrangement structure of a reducing agent tank in a construction machine, the construction machine being configured of a lower traveling body, an upper slewing body supported on the lower traveling body to be capable of slewing, and an operation device mounted on the upper slewing body, and being mounted with an engine, an exhaust gas purifying device provided on an exhaust gas path of the engine, a reducing agent tank that stores a reducing agent used in the exhaust gas purifying device, a hydraulic actuator, and a control valve that controls an operation of the hydraulic actuator, wherein a valve accommodating chamber accommodating the control valve is provided on a front section of the upper slewing body, a tank accommodating chamber accommodating the reducing agent tank is provided above the valve accommodating chamber, the reducing agent tank is arranged above a partition plate that separates the tank accommodating chamber and the valve accommodating chamber above and below in a state where airspace as an air flow passage exists in an interval between the reducing agent tank and the partition plate, and a gap as an inflow-outflow opening for external air to pass through the air flow passage is provided vertically between a cover body covering the tank accommodating chamber and a cover body covering the valve accommodating chamber, for a configuration in which external air passes through the gap and flows in and out of the air flow passage during traveling or during slewing of the upper slewing body.

An invention of claim 3 is the arrangement structure of a reducing agent tank in a construction machine according to claim 1 or 2, wherein a side surface and/or an upper surface of the cover body covering the tank accommodating chamber is provided with an opening hole as an inflow-outflow opening for external air to pass through the air flow passage.

An invention of claim 4 is the arrangement structure of a reducing agent tank in a construction machine according to any one of claims 1 to 3, wherein the reducing agent tank is supported on the valve accommodating chamber via a supporting member, and the partition plate is an upper surface plate included in the supporting member.

An invention of claim 5 is the arrangement structure of a reducing agent tank in a construction machine according to claim 4, wherein the reducing agent tank is supported by the supporting member in a state of being held by a tank holding member.

Advantageous Effects of Invention

With the invention of claim 1, external air that flows in and out from the gap provided vertically between the cover body covering the tank accommodating chamber and the cover body covering the valve accommodating chamber flows in the air flow passage formed between the partition plate that separates the tank accommodating chamber and the valve accommodating chamber above and below and the urea water tank. Even with the tank accommodating chamber being provided above the valve accommodating chamber, transfer of heat of the control valve to the reducing agent tank can be blocked reliably.

With the invention of claim 2, the inflow and outflow of external air through the air flow passage is made more active during traveling or during slewing of the upper slewing body.

With the invention of claim 3, the flow of external air in the air flow passage is facilitated, and a temperature increase of the reducing agent tank can further reliably be suppressed.

With the invention of claim 4, the reducing agent tank can be supported stably, and the supporting member serves also as the partition plate. Thus, the member can be used in a versatile manner.

With the invention of claim 5, the airspace as the air flow passage can be formed easily between the reducing agent tank and the partition plate.

DESCRIPTION OF EMBODIMENTS

Figure 1:
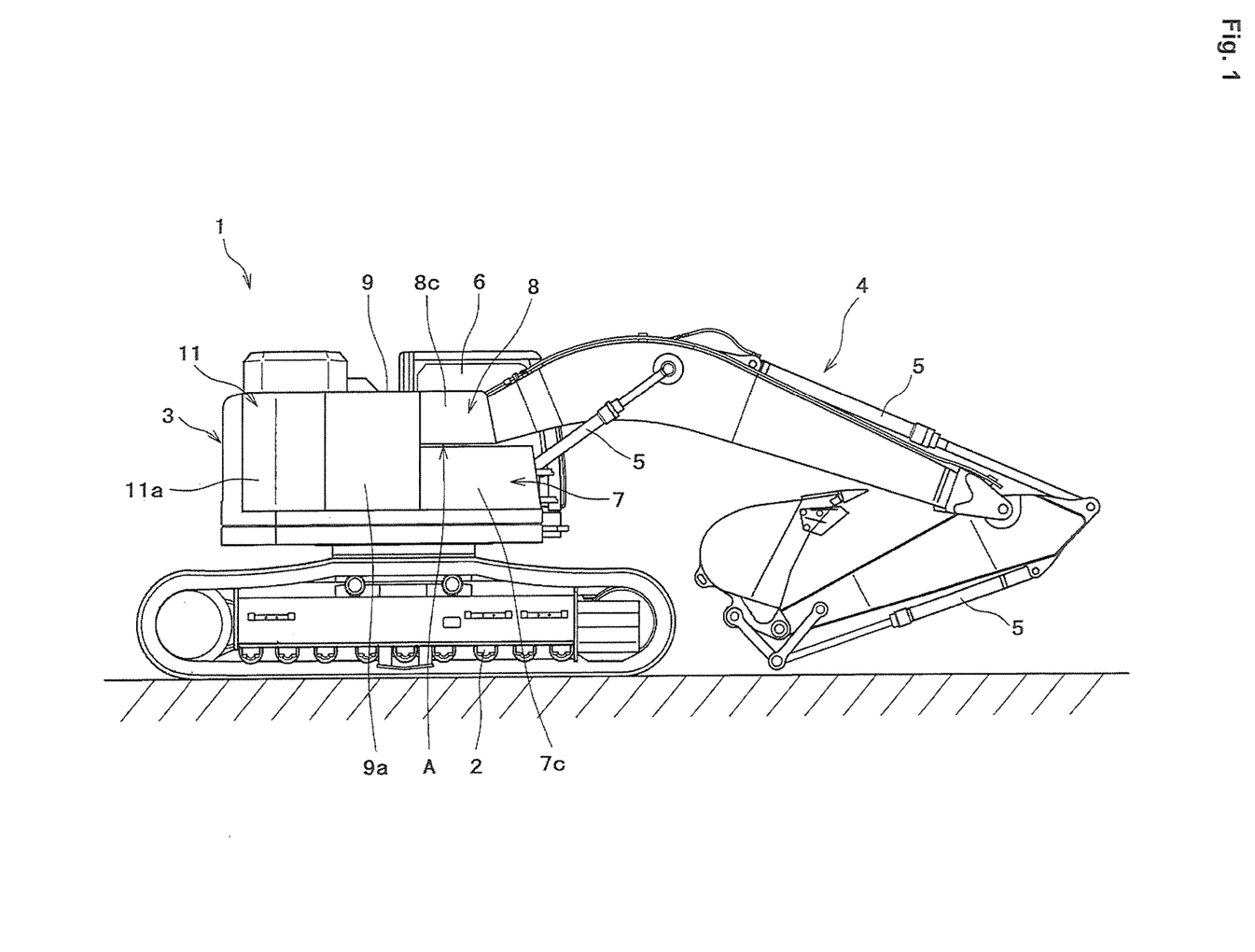
FIG. 1 is a side view of a hydraulic shovel.

An embodiment of the present invention will be described below based on the drawings. In the drawing, 1 denotes a hydraulic shovel that is one example of a construction machine. The hydraulic shovel 1 is configured of a crawler-type lower traveling body 2, an upper slewing body 3 supported above the lower traveling body 2 to be capable of slewing, an operation device 4 that is mounted on the front section of the upper slewing body 3 to perform various operations such as digging, and the like, and includes various hydraulic actuators such as a hydraulic motor for traveling (not shown) that is for causing the lower traveling body 2 to travel, a hydraulic motor for slewing (not shown) that is for causing the upper slewing body 3 to slew, and a hydraulic cylinder (boom cylinder, arm cylinder, or bucket cylinder) 5 for operation device that is for driving the operation device 4.

Figure 2:
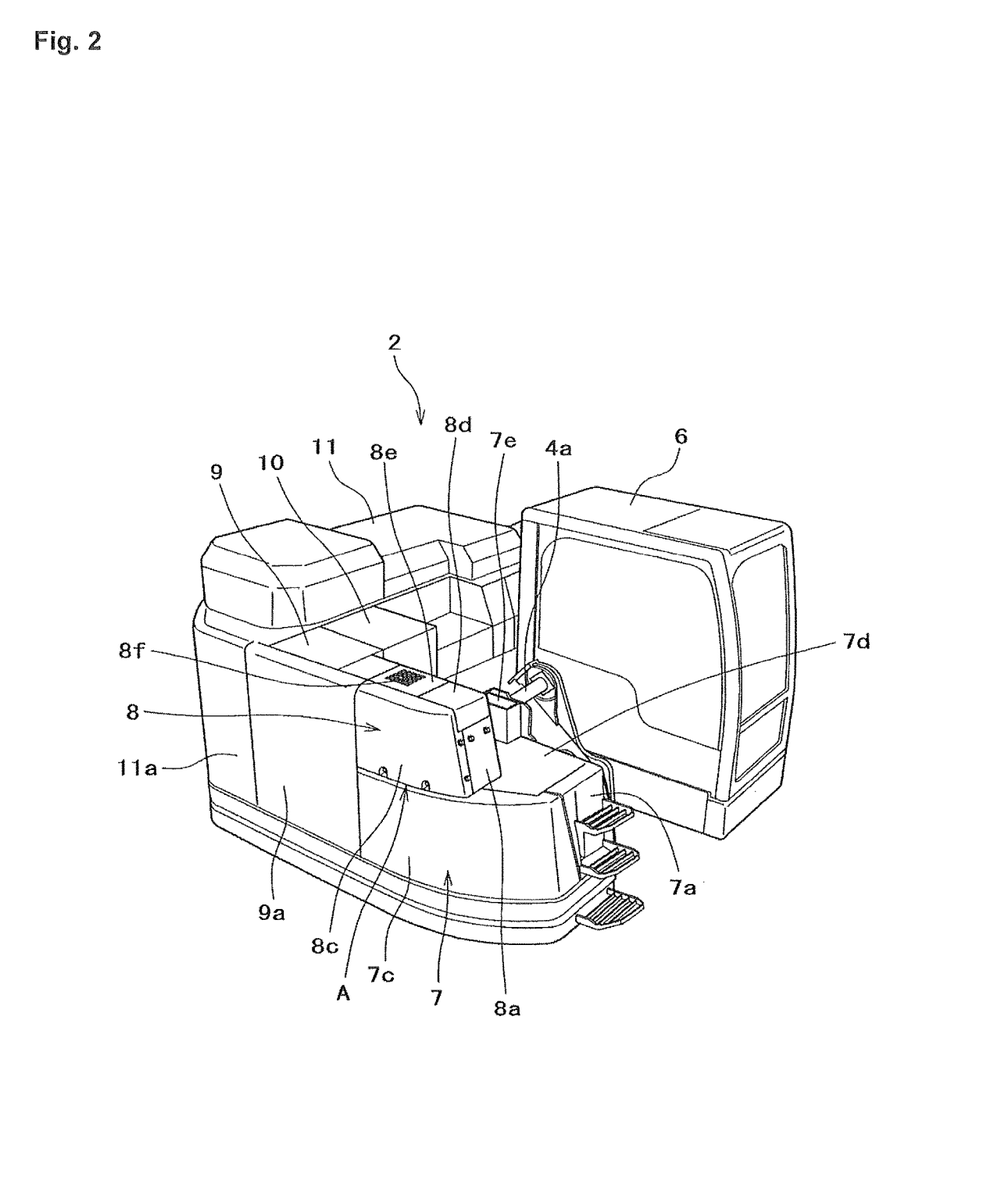
FIG. 2 is a perspective view of an upper slewing body when seen from the front right.
Figure 3:
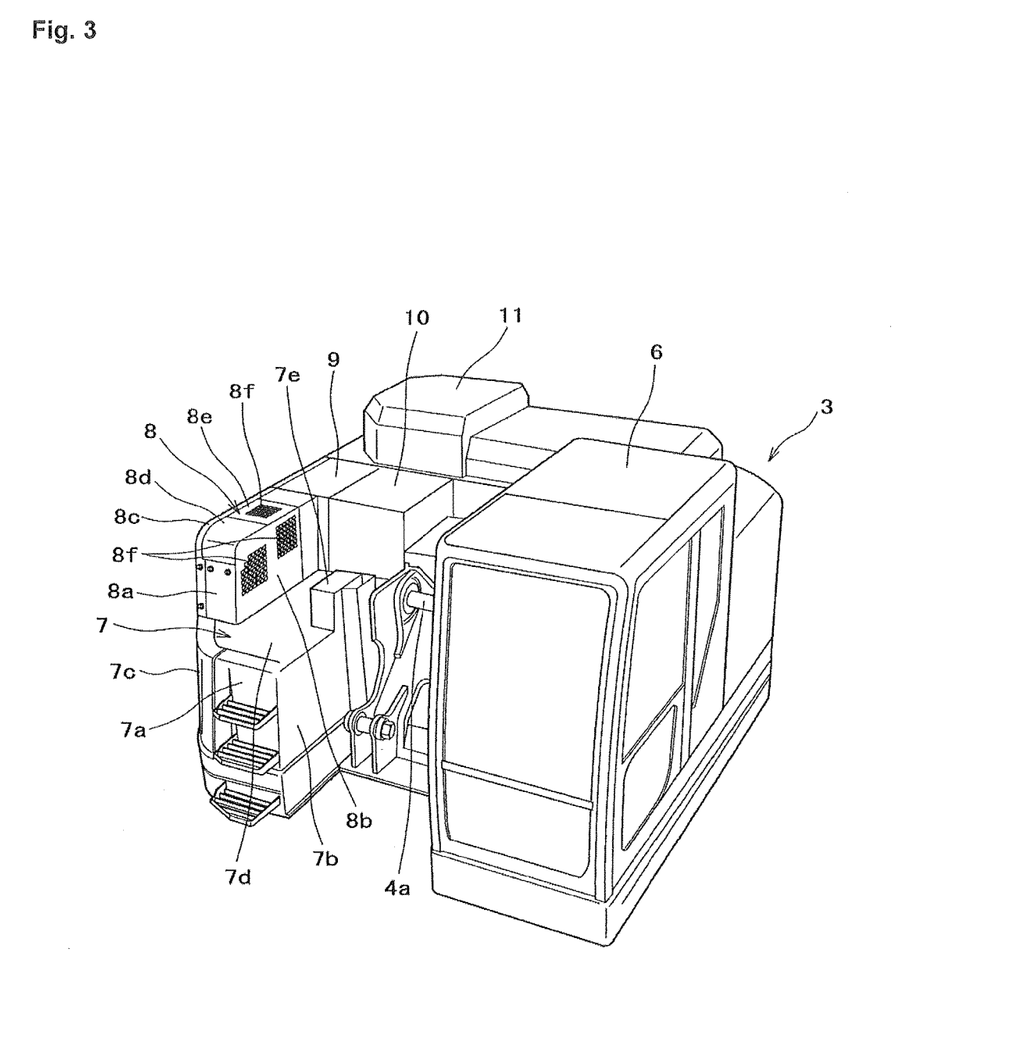
FIG. 3 is a perspective view of the upper slewing body when seen from the front left.

At the front section of the upper slewing body 3, an operation device attaching section 4a to which the base end section of the operation device 4 is attached to be capable of moving upward and downward is provided in the middle section in the left-right direction. A cab 6 is arranged to the left side of the operation device attaching section 4a, while a valve accommodating chamber 7 and a tank accommodating chamber 8 described later are arranged to the right side of the operation device attaching section 4a in a state where the valve accommodating chamber 7 is located on the lower side and the tank accommodating chamber 8 on the upper side. Further, in the rear of the valve accommodating chamber 7 and the tank accommodating chamber 8, a fuel tank 9 and an operating oil tank 10 are arranged to be adjacent to the left and right in a state where the fuel tank 9 is located on the right side and the operating oil tank 10 on the left side. Further, in the rear of the fuel tank 9, the operating oil tank 10, and the cab 6, an engine room 11 is arranged. The engine room 11 accommodates various instruments and devices, all of which are not shown, such as an engine (diesel engine) as a power source, an exhaust gas purifying device provided on an exhaust gas path of the engine, a hydraulic pump driven by the engine to supply pressure oil to the hydraulic actuator, a cooling device such as a radiator or oil cooler, and a muffler. In the description of this embodiment, the front, rear, left, and right directions are based on an operator sitting in the driver's seat within the cab 6.

The exhaust gas purifying device is provided on the exhaust gas path of the engine in order to remove nitrogen oxide within exhaust gas discharged from the engine. In this embodiment, the exhaust gas purifying device employs a urea SCR system configured such that urea water (corresponding to reducing agent of the present invention) is injected into the exhaust gas path from a urea water injection device to cause hydrolysis under high temperature, and nitrogen oxide within exhaust gas is reduced by obtained ammonia and broken down into nitrogen and water. In the exhaust gas purifying device, although not shown, a PM diesel particulate filter (DPF) having a filter that collects particulate matter (PM) is also arranged. Exhaust gas discharged from the engine is purified by the exhaust gas purifying device and discharged outside the machine via the muffler. A urea water tank (corresponding to reducing agent tank of the present invention) 12 that stores urea water used in the exhaust gas purifying device is accommodated in the tank accommodating chamber 8, in a manner described later.

Figure 4:
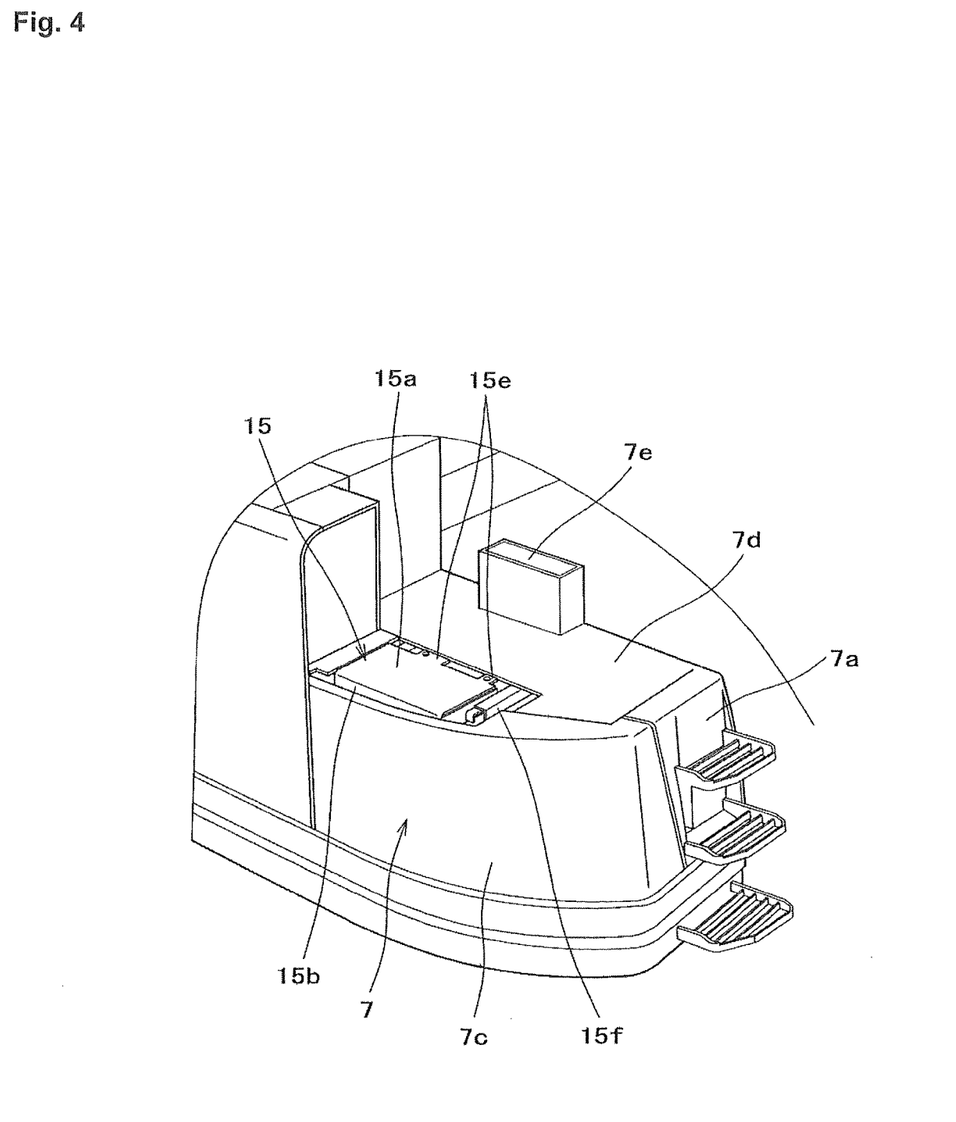
FIG. 4 is a perspective view showing a valve accommodating chamber in a state where a tank accommodating chamber is omitted.
Figure 5:
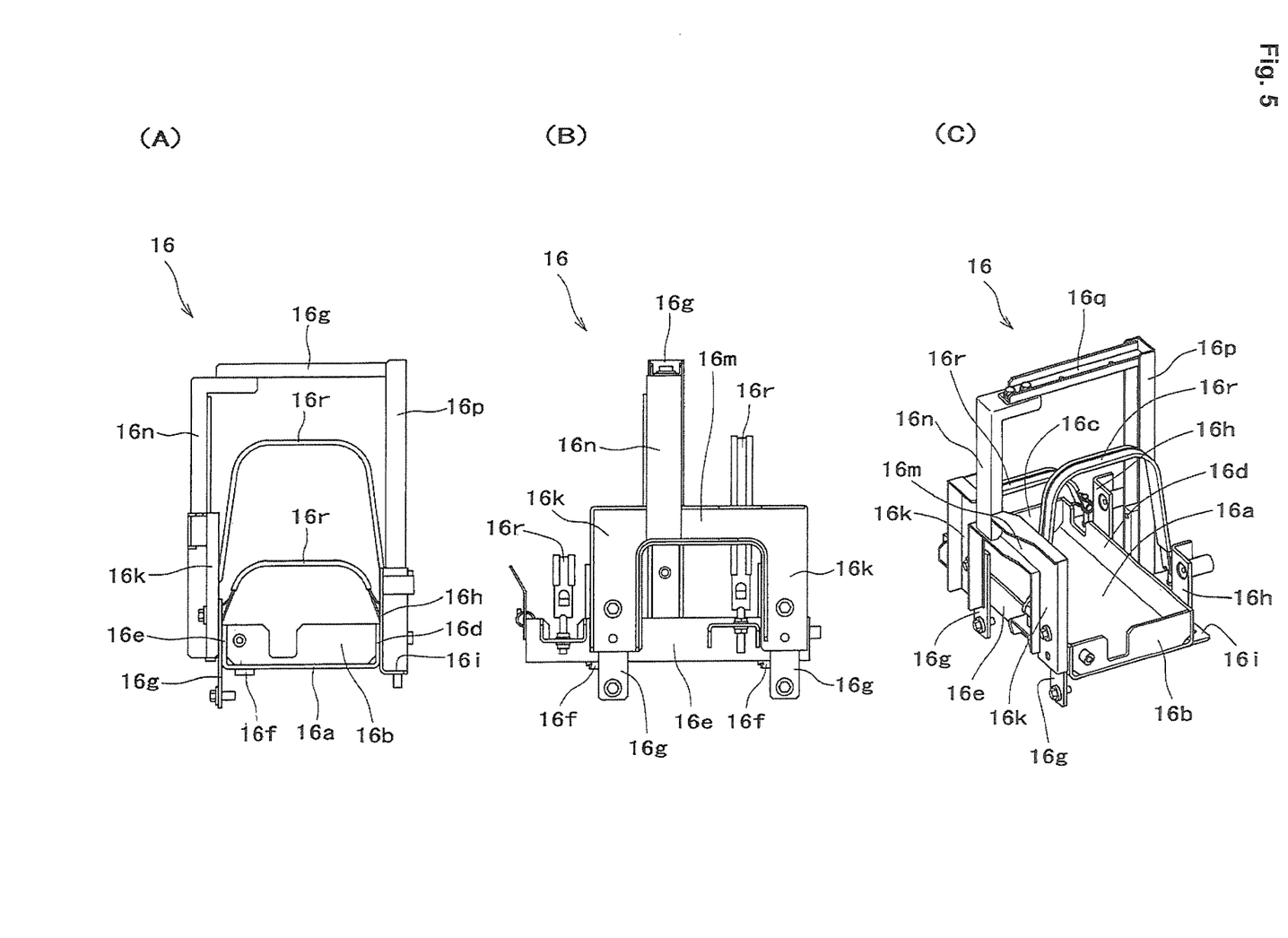
FIGS. 5(A), 5(B), and 5(C) are respectively a front view, a side view, and a perspective view of a tank holding member.

Meanwhile, 13 denotes a control valve that controls the operation of the plurality of hydraulic actuators provided in the hydraulic shovel 1. The control valve 13 in which many control valves; pilot valves, or the like have been incorporated and unitized is accommodated in the valve accommodating chamber 7.

As described above, the valve accommodating chamber 7 is arranged to the right side of the operation device attaching section 4a, i.e., the right side in the front section of the upper slewing body 3, such that the front, the left, the right, and the rear are covered respectively by a front surface plate 7a, by a left surface plate 7b, by a right-side surface cover 7c, and by front-side surfaces of the fuel tank 9 and the operating oil tank 10. The right-side surface cover 7c of the valve accommodating chamber 7 is approximately flush with a right-side surface cover 8c of the tank accommodating chamber 8 arranged above the valve accommodating chamber 7, a right-side surface cover 9a of the fuel tank 9 arranged in the rear of the valve accommodating chamber 7 and the tank accommodating chamber 8, and a right-side surface cover 11a of the engine room 11 arranged in the rear of the fuel tank 9 to form the outside surface on the right side of the upper slewing body 3. Further, the right side in the rear-half section at the top of the valve accommodating chamber 7 is covered by an upper surface plate 15a of a supporting member 15 described later, and the left side in the front-half section and the rear-half section at the top by an upper surface cover 7d. The upper surface plate 15a of the supporting member 15 and the upper surface cover 7d are approximately flush with each other and form the upper surface of the valve accommodating chamber 7. At the left-side end section in the rear-half section of the upper surface cover 7d, a pipe drawing opening 7e for drawing out a hydraulic pipe (not shown) connected to the control valve 13 to the operation device 4 side is provided.

The supporting member 15 is configured to include the quadrangular upper surface plate 15a forming the upper surface of the valve accommodating chamber 7, an edge 15b hanging down from the circumferential edge section of the upper surface plate 15a, two front and rear leg pieces 15c extending downward from the front and rear corner sections at the right side of the edge 15b, two front and rear vertical supporting columns 15d extending downward from the leg pieces 15c such that the lower end sections are fixed and supported on a floor surface 7f of the valve accommodating chamber 7, front and rear left-side fixing pieces 15e formed to protrude toward the left from the left edge section of the upper surface plate 15a, and two front and rear horizontal supporting columns 15f extending in the left direction from the front and rear sections of the upper surface plate 15a such that the left end sections are fixed and supported on the left surface plate 7b of the valve accommodating chamber 7.

Figure 9:
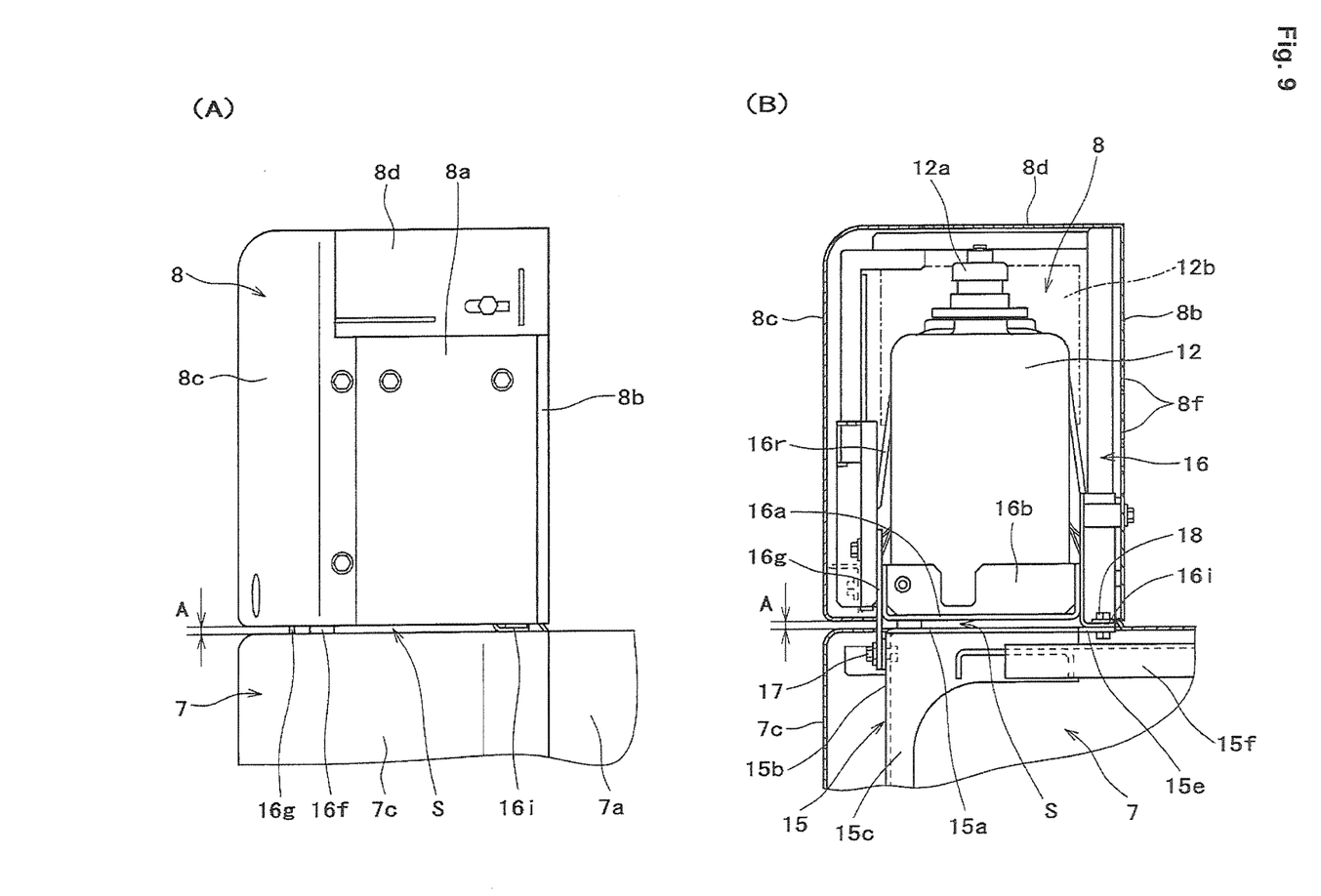
FIG. 9(A) is a view showing the tank accommodating chamber arranged above the valve accommodating chamber.
FIG. 9(B) is a partial cutout view of FIG. 9(A).

Meanwhile, the tank accommodating chamber 8 accommodating the urea water tank 12 is provided above the valve accommodating chamber 7 on the right side in the rear-half section, i.e., above the upper surface plate 15a of the supporting member 15. Thus, the tank accommodating chamber 8 and the valve accommodating chamber 7 are in a state of being separated above and below by the upper surface plate 15a of the supporting member 15. The urea water tank 12 is accommodated in the tank accommodating chamber 8 in a state where the urea water tank 12 is held by the tank holding member 16 described later and further the tank holding member 16 is attached to and supported by the supporting member 15, i.e., a state of being supported on the valve accommodating chamber 7 via the tank holding member 16 and the supporting member 15. The supporting member upper surface plate 15a (the upper surface plate 15a of the supporting member 15) corresponds to a partition plate that separates the tank accommodating chamber and the valve accommodating chamber of the present invention above and below. Hereinafter, the supporting member upper surface plate 15a is also called the partition plate 15a.

The tank holding member 16 is configured to include a quadrangular placement plate 16a on which the urea water tank 12 is placed, front, rear, left, and right edges 16b to 16e that stand from the four circumferential edge sections of the placement plate 16a, two front and rear leg platforms 16f fixed at the right-side end section of the lower surface of the placement plate 16a, two front and rear right-side attaching pieces 16g fixed at the outer surface of the right-side edge 16e such that the upper end protrudes upward relative to the upper end of the right-side edge 16e and the lower end protrudes downward relative to the lower end of the leg platform 16f, two front and rear left-side first attaching pieces 16h fixed at the outer surface of the left-side edge 16d such that the upper end protrudes upward relative to the upper end of the left-side edge 16d and the lower end protrudes downward relative to the lower end of the left-side edge 16d, a left-side second attaching piece 16i formed to be bent toward the left direction from the lower end section of the left-side first attaching piece 16h such that the lower surface is in the same height position as the lower surface of the leg platform 16f, two front and rear right-side first vertical pieces 16k of which the lower end sections are respectively bolted to the front and rear right-side attaching pieces 16g to extend upward relative to the right-side attaching piece 16g, a connecting piece 16m that connects the upper end sections of the front and rear right-side first vertical pieces 16k, a right-side second vertical piece 16n extending upward from the intermediate section of the connecting piece 16m in the front-back direction, a left-side vertical piece 16p extending upward from the intermediate section of the left-side edge 16d in the front-back direction, a horizontal piece 16q formed by bolting the tip end sections of the right-side portion of the horizontal piece extending in the left direction from the upper end section of the right-side second vertical piece 16n and the left-side portion of the horizontal piece extending in the right direction from the upper end section of the left-side vertical piece 16p, and two front and rear fixing bands 16r for fixing the urea water tank 12 placed on the placement plate 16a. The urea water tank 12 is held by the tank holding member 16 by being fixed by the fixing band 16r in a state of being placed on the placement plate 16a. The urea water tank 12 has a twostepped shape in which the front-half section is higher and the rear-half section is lower. In the upper section in the front-half section that is higher in position, a supply opening 12a is formed. Meanwhile, on the upper side in the rear-half section that is lower in position, an instrument 12b such as a supply pump is arranged. The two front and rear fixing bands 16r respectively fix the front-half section and the rear-half section of the urea water tank 12. Further, between the lower surface of the urea water tank 12 and the placement plate 16a, a rubber sheet as a vibration-proof material and heat insulating material is laid, although not shown.

Figure 6:
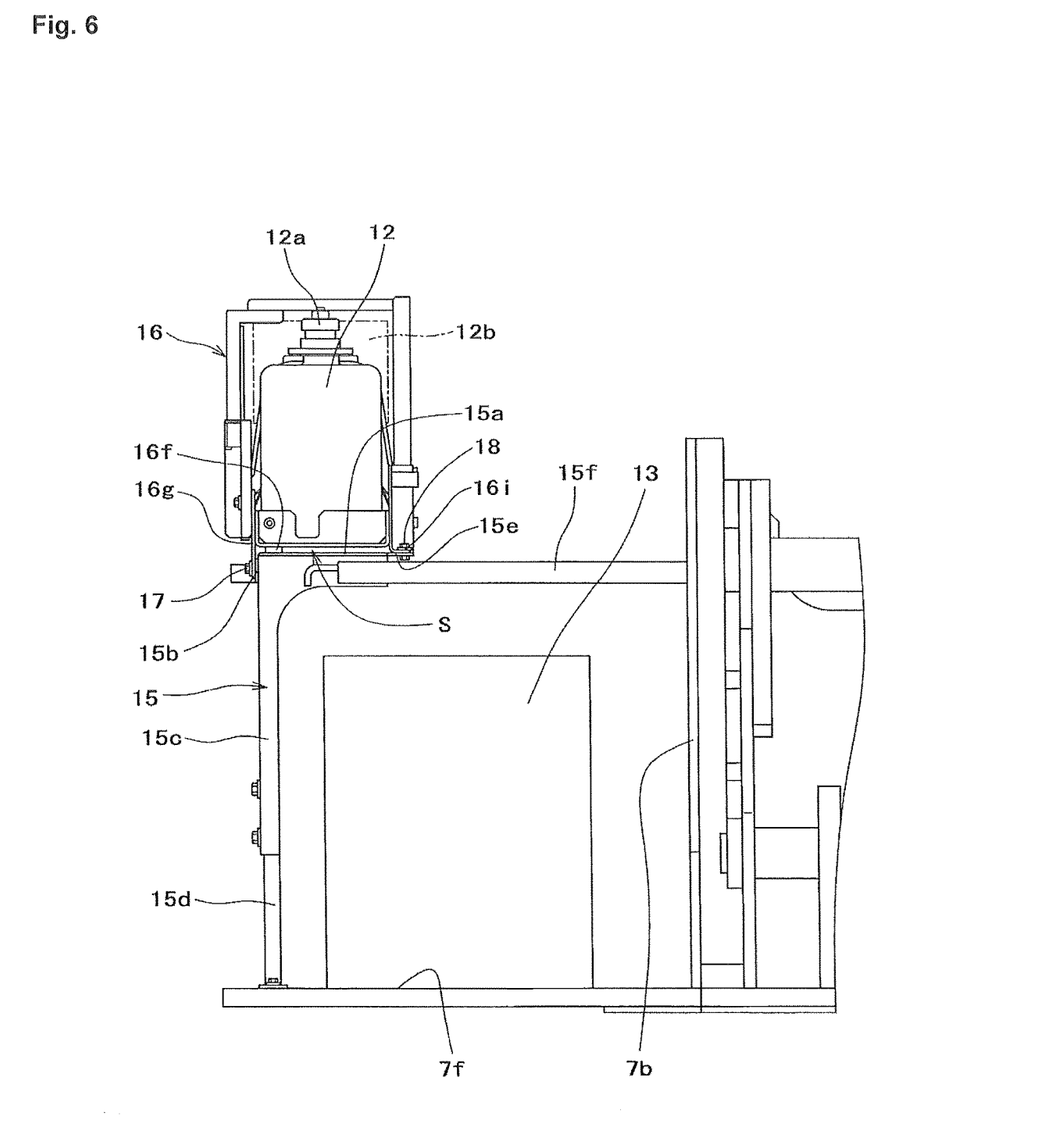
FIG. 6 is a front view showing the tank holding member attached to a supporting member and a urea water tank.
Figure 7:
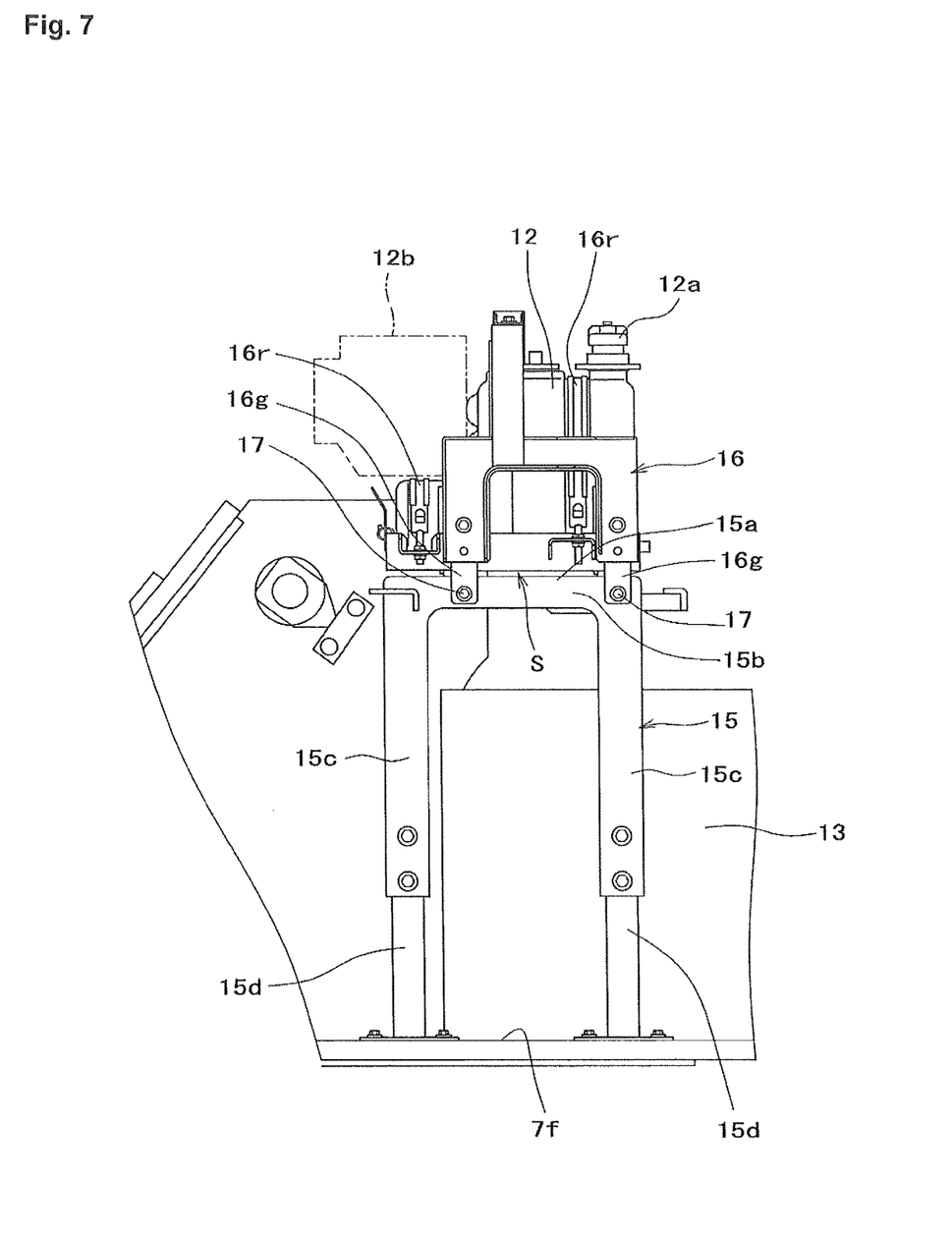
FIG. 7 is a side view showing the tank holding member attached to the supporting member and the urea water tank.
Figure 8:
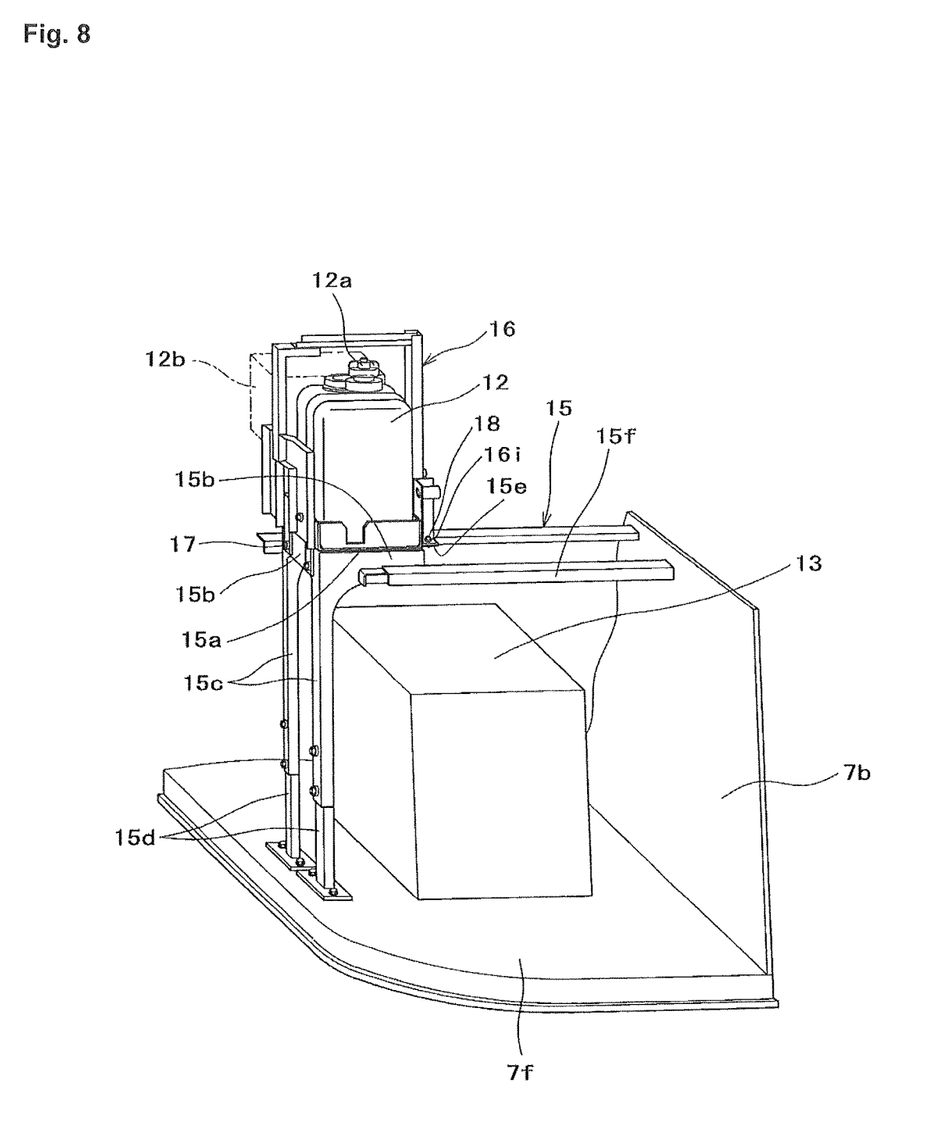
FIG. 8 is a perspective view showing the tank holding member attached to the supporting member and the urea water tank.

The tank holding member 16 that holds the urea water tank 12 is attached to and supported by the supporting member 15 as described above. In this case, the tank holding member 16 is first placed on the upper surface plate 15a of the supporting member 15, such that the lower surface of the leg platform 16f of the tank holding member 16 and the lower surface of the left-side second attaching piece 16i of the tank holding member 16 respectively contact the right end section of the upper surface of the upper surface plate 15a of the supporting member 15 and the upper surface of the left-side fixing piece 15e of the supporting member 15. Thus, the placement plate 16a of the tank holding member 16 is in a state of being above the supporting member upper surface plate 15a by the height of the leg platform 16f. In this state, the lower section of the right-side attaching piece 16g of the tank holding member 16 is fixed to the edge 15b at the right side of the supporting member 15 using a bolt 17, and further the left-side second attaching piece 16i of the tank holding member 16 is fixed to the left-side fixing piece 15e of the supporting member 15 using a bolt 18. Accordingly, the tank holding member 16 is configured to be attached to and supported by the supporting member 15. The placement plate 16a of the tank holding member 16 attached to and supported by the supporting member 15 is in a state of being above the supporting member upper surface plate 15a by the height of the leg platform 16f (e.g., a state of being above by 12 mm) as described above. Accordingly, airspace as an air flow passage S is formed between the urea water tank 12 held by the tank holding member 16 and the supporting member upper surface plate 15a.

The tank accommodating chamber 8 is such that the front surface, the left, the right, the front-half section at the top, the rear-half section at the top, and the rear are covered respectively by a front surface cover 8a, by a left-side surface cover 8b, by the right-side surface cover 8c, by an opening-closing cover 8d that is openable and closable, by an upper surface cover 8e, and by the front-side surface of the fuel tank 9. The right-side surface cover 8c is attached by bolt fastening of the lower end section to the right-side first vertical piece 16k of the tank holding member 16. The left-side surface cover 8b and the upper surface cover 8e are integrally formed. In a state where the opening-closing cover 8d and the front surface cover 8a are assembled thereto, the lower end section of the left-side surface cover 8b is fastened by a bolt to the left-side first attaching piece 16h of the tank holding member 16, and further the right end section of the front surface cover 8a is fastened by a bolt to the right-side surface cover 8c. Accordingly, the front surface cover 8a, the left-side surface cover 8b, the opening-closing cover 8d, and the upper surface cover 8e are attached. In the case of supplying urea water to the urea water tank 12, the opening-closing cover 8d covering the front-half section at the top of the tank accommodating chamber 8 is opened, so that the supply opening 12a of the urea water tank 12 is exposed and urea water can be supplied from here.

The right-side surface cover 8c of the tank accommodating chamber 8 is approximately flush with the right-side surface cover 7c of the valve accommodating chamber 7 and the like and form the right-side outer surface of the upper slewing body 3, as described above. Vertically between the lower end section of the right-side surface cover 8c of the tank accommodating chamber 8 and the upper end section of the right-side surface cover 7c of the valve accommodating chamber 7, a gap A as an inflow-outflow opening for external air to pass through the air flow passage S is provided. The lower end section of the front surface cover 8a of the tank accommodating chamber 8 is located on the upper side of the upper surface cover 7d of the valve accommodating chamber 7. Also vertically between the lower end section of the front surface cover 8a of the tank accommodating chamber 8 and the upper surface cover 7d of the valve accommodating chamber 7, the gap A as the inflow-outflow opening for external air to pass through the air flow passage S is provided. Moreover, at the left-side surface cover 8b and the upper surface cover 8e of the tank accommodating chamber 8, a plurality of opening holes 8f as inflow-outflow openings for external air to pass through the air flow passage S are opened. In this embodiment, the right-side surface cover 8c and the front surface cover 8a of the tank accommodating chamber 8 correspond to a cover body covering the tank accommodating chamber of the present invention. The right-side surface cover 7c and the upper surface cover 7d of the valve accommodating chamber 7 correspond to a cover body covering the valve accommodating chamber of the present invention. Further, the left-side surface cover 8b and the upper surface cover 8e of the tank accommodating chamber 8 respectively correspond to a side surface and an upper surface of the cover body covering the tank accommodating chamber of the present invention.

Figure 10:
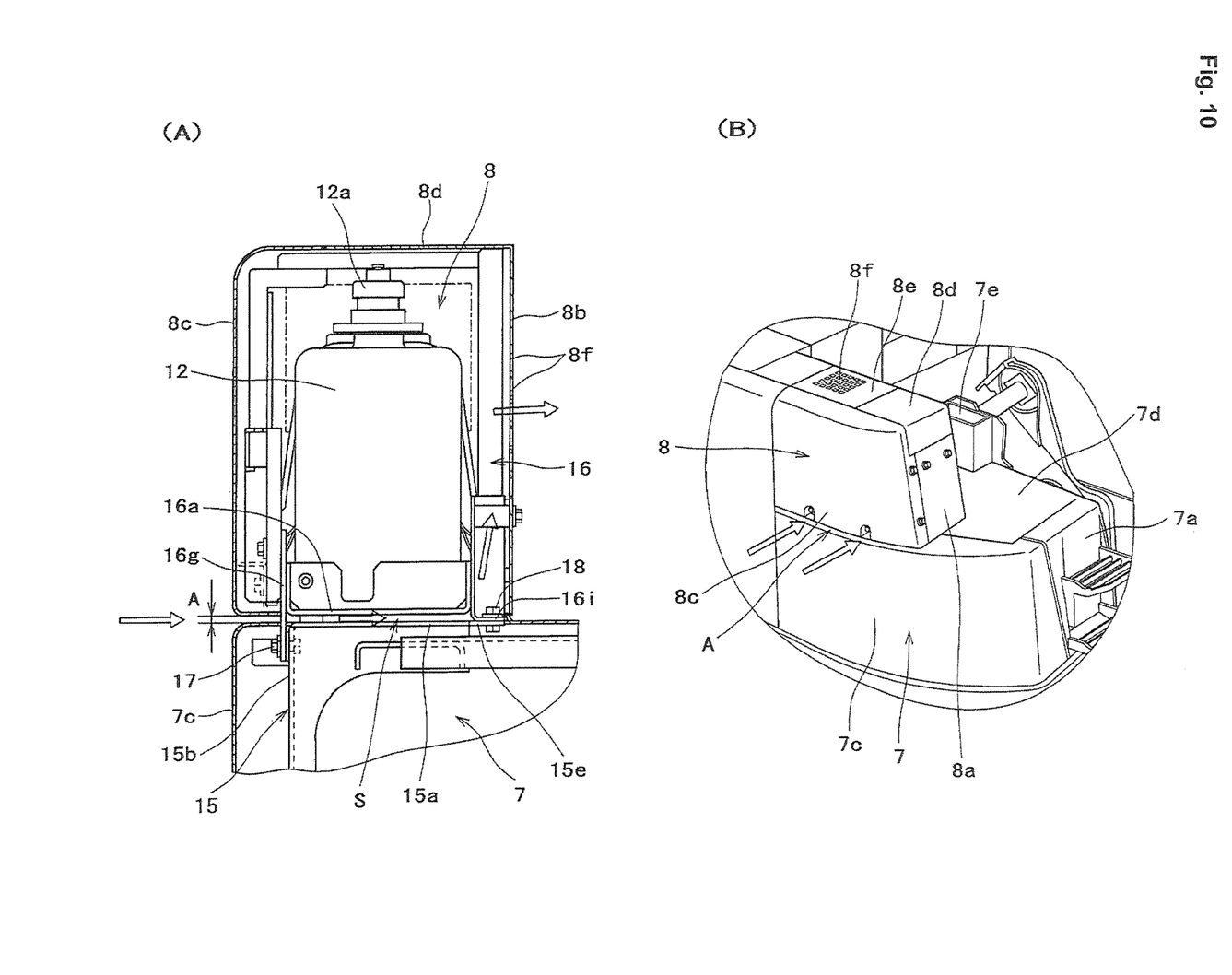
FIGS. 10(A) and 10(B) are views showing the flow of air during slewing to the right.
Figure 11:
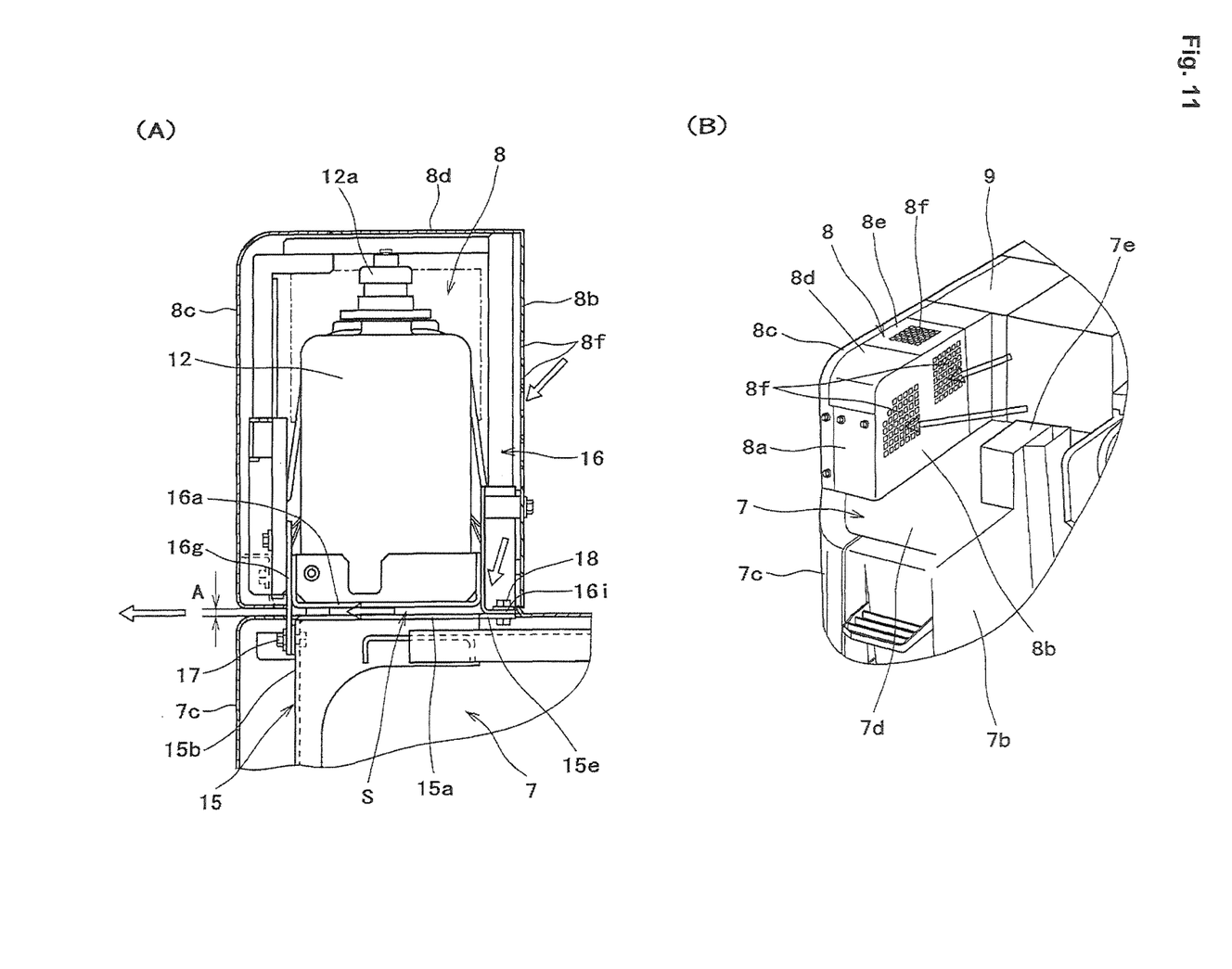
FIGS. 11(A) and 11(B) are views showing the flow of air during slewing to the left.

During slewing of the upper slewing body 3 to the right, as shown in FIG. 10, external air flows in from the gap A vertically between the right-side surface cover 8c of the tank accommodating chamber 8 and the right-side surface cover 7c of the valve accommodating chamber 7, passes through the air flow passage S between the urea water tank 12 and the supporting member upper surface plate 15a, and flows out from the opening hole 8f of the left-side surface cover 8b of the tank accommodating chamber 8. During slewing of the upper slewing body 3 to the left on the other hand, as shown in FIG. 11, external air flows in from the opening hole 8f of the left-side surface cover 8b of the tank accommodating chamber 8, passes through the air flow passage S between the urea water tank 12 and the supporting member upper surface plate 15a, and flows out from the gap A vertically between the right-side surface cover 8c of the tank accommodating chamber 8 and the right-side surface cover 7c of the valve accommodating chamber 7. In this case, the right-side surface cover 8c of the tank accommodating chamber 8 and the right-side surface cover 7c of the valve accommodating chamber 7 are both the cover bodies forming the right-side outer surface of the upper slewing body 3. Therefore, the inflow and outflow of external air through the air flow passage S from the gap A provided vertically between the right-side surface covers 8c and 7c are made efficient. Thus, during slewing to the left or right, or due to the machine body traveling or natural air even when slewing is not performed, external air flowing in and out from the gap A vertically between the right-side surface cover 8c of the tank accommodating chamber 8 and the right-side surface cover 7c of the valve accommodating chamber 7, the gap A vertically between the front surface cover 8a of the tank accommodating chamber 8 and the upper surface cover 7*d* of the valve accommodating chamber 7, or the opening hole 8*f* opened at the upper surface cover 8*e* of the tank accommodating chamber left-side surface cover 8*b* flows in the air flow passage S. Accordingly, transfer of heat of the control valve 13 accommodated in the valve accommodating chamber 7 below the supporting member upper surface plate 15*a* to the urea water tank 12 can be blocked reliably, and constant ventilation of the tank accommodating chamber 8 can suppress a temperature increase of the tank accommodating chamber 8.

In this embodiment configured as described above, the hydraulic shovel 1 is configured of the lower traveling body 2, the upper slewing body 3 supported on the lower traveling body 2 to be capable of slewing, the operation device 4 mounted on the upper slewing body 3, and the like, and is mounted with the engine, the exhaust gas purifying device provided on the exhaust gas path of the engine, the urea water tank 12 that stores urea water used in the exhaust gas purifying device, the hydraulic actuators (the hydraulic motor for traveling, the hydraulic motor for slewing, the hydraulic cylinder 5 for operation device, and the like), the control valve 13 that controls the operation of the hydraulic actuators, and the like. Herein, the valve accommodating chamber 7 accommodating the control valve 13 is provided on the front section of the upper slewing body 3, and the tank accommodating chamber 8 accommodating the urea water tank 12 is provided above the valve accommodating chamber 7. Thus, space above the valve accommodating chamber 7 can be utilized effectively to provide the tank accommodating chamber 8. Herein, the urea water tank 12 is arranged above the partition plate 15*a* (the upper surface plate 15*a* of the supporting member 15) that separates the tank accommodating chamber 8 and the valve accommodating chamber 7 above and below in a state where the airspace as the air flow passage S exists in the interval between the urea water tank 12 and the partition plate 15*a*. Meanwhile, vertically between the cover body (the right-side surface cover 8*c* and the front surface cover 8*a*) covering the tank accommodating chamber 8 and the cover body (the right-side surface cover 7*c* and the upper surface cover 7*d*) covering the valve accommodating chamber 7, the gap A as the inflow-outflow opening for external air to pass through the air flow passage S is provided. Particularly during traveling or during slewing of the upper slewing body 3, external air passes through the gap A and flows in and out of the air flow passage S more actively.

Thus, during traveling or during slewing of the upper slewing body 3, or due to natural air even when it is motionless, external air flowing in and out from the gap A provided vertically between the cover body covering the tank accommodating chamber 8 and the cover body covering the valve accommodating chamber 7 flows in the air flow passage S formed between the partition plate 15*a* separating the two accommodating chambers that are the tank accommodating chamber 8 and the valve accommodating chamber 7 above and below and the urea water tank 12. Accordingly, even with the tank accommodating chamber 8 accommodating the urea water tank 12 being provided above the valve accommodating chamber 7 accommodating the control valve 13 that is a heat generating body, transfer of heat of the control valve 13 to the urea water tank 12 can be blocked reliably, and constant ventilation within the tank accommodating chamber 8 by external air flowing in and out of the tank accommodating chamber 8 from the air flow passage S can suppress a temperature increase of the urea water tank 12.

Further, at the side surface and the upper surface (the left-side surface cover 8*b* and the upper surface cover 8*e*) of the cover body covering the tank accommodating chamber 8 herein, the opening holes 8*f* as the inflow-outflow openings for external air to pass through the air flow passage S are provided. Accordingly, external air flowing in from the gap A passes through the air flow passage S and flows out from opening hole 8*f*, or external air flowing in from the opening hole 8*f* passes through the air flow passage S and flows out from the gap A. Thus, the flow of external air in the air flow passage S is facilitated, and a temperature increase of the urea water tank 12 can further reliably be suppressed.

Since the urea water tank 12 is supported on the valve accommodating chamber 7 via the supporting member 15 herein, the urea water tank 12 can be supported stably, even while being accommodated in the tank accommodating chamber 8 provided above the valve accommodating chamber 7. Since the partition plate 15*a* that separates the tank accommodating chamber 8 and the valve accommodating chamber 7 above and below is the upper surface plate 15*a* forming the supporting member 15, the supporting member 15 serves also as the partition plate 15*a*. Thus, the member can be used in a versatile manner.

Further, since the urea water tank 12 is supported by the supporting member 15 in a state of being held by the tank holding member 16, airspace as the air flow passage S can be formed easily between the urea water tank 12 and the partition plate 15*a* by causing the tank holding member 16 to be supported by the supporting member 15 in a state of being above the partition plate 15*a*.

The present invention is obviously not limited to the embodiment. For example, in the embodiment, the gap A as the inflow-outflow opening for external air to pass through the air flow passage S is provided vertically between the right-side surface cover 8*c* of the tank accommodating chamber 8 and the right-side surface cover 7*c* of the valve accommodating chamber 7 and vertically between the front surface cover 8*a* of the tank accommodating chamber 8 and the upper surface cover 7*d* of the valve accommodating chamber 7. However, the gap A may be provided only vertically between one of the combinations, or the gap A can be provided vertically between the left-side surface cover 8*b* of the tank accommodating chamber 8 and the upper surface cover 7*d* of the valve accommodating chamber 7.

Further, in the embodiment, the side surface and the upper surface (the left-side surface cover 8*b* and the upper surface cover 8*e*) of the tank accommodating chamber 8 are provided with the opening holes 8*f*, thereby allowing efficient inflow and outflow of external air. However, the opening hole 8*f* may be provided only on the side surface or only the upper surface.

Moreover, in the embodiment, the present invention is carried out in the hydraulic shovel. However, the present invention can obviously be carried out in a construction machine other than a hydraulic shovel.

INDUSTRIAL APPLICABILITY

The present invention can be utilized in the case where a reducing agent tank that stores a reducing agent tank used in an exhaust gas purifying device is arranged in a construction machine provided with an exhaust gas purifying device.

The invention claimed is:
1. An arrangement structure of a reducing agent tank in a construction machine, the construction machine being mounted with an engine, an exhaust gas purifying device provided on an exhaust gas path of the engine, a reducing agent tank that stores a reducing agent used in the exhaust gas purifying device, a hydraulic actuator, and a control valve that controls an operation of the hydraulic actuator, the arrangement comprising:

a tank accommodating chamber accommodating the reducing agent tank;

a valve accommodating chamber accommodating the control valve below the tank accommodating chamber;

a partition plate that separates the tank accommodating chamber and the valve accommodating chamber, wherein an air flow passage exists in an interval between the reducing agent tank and the partition plate, and an inflow-outflow opening for external air to pass through the air flow passage is provided vertically between a cover body covering the tank accommodating chamber and a cover body covering the valve accommodating chamber.

2. An arrangement structure of a reducing agent tank in a construction machine, the construction machine being configured of a lower traveling body, an upper slewing body supported on the lower traveling body to be capable of slewing, and an operation device mounted on the upper slewing body, and being mounted with an engine, an exhaust gas purifying device provided on an exhaust gas path of the engine, a reducing agent tank that stores a reducing agent used in the exhaust gas purifying device, a hydraulic actuator, and a control valve that controls an operation of the hydraulic actuator, comprising:

a valve accommodating chamber accommodating the control valve provided on a front section of the upper slewing body;

a tank accommodating chamber accommodating the reducing agent tank provided above the valve accommodating chamber; and a partition plate that separates the tank accommodating chamber and the valve accommodating chamber wherein an air flow passage exists in an interval between the reducing agent tank and the partition plate, and an inflow-outflow opening for external air to pass through the air flow passage is provided vertically between a cover body covering the tank accommodating chamber and a cover body covering the valve accommodating chamber, for a configuration in which external air passes through the gap and flows in and out of the air flow passage during traveling or during slewing of the upper slewing body.

3. The arrangement structure of a reducing agent tank in a construction machine according to claim 1, wherein a side surface and/or an upper surface of the cover body covering the tank accommodating chamber is provided with an opening hole as an inflow-outflow opening for external air to pass through the air flow passage.

4. The arrangement structure of a reducing agent tank in a construction machine according to claim 1, wherein the reducing agent tank is supported on the valve accommodating chamber via a supporting member, and the partition plate is an upper surface plate included in the supporting member.

5. The arrangement structure of a reducing agent tank in a construction machine according to claim 4, wherein the reducing agent tank is supported by the supporting member in a state of being held by a tank holding member.

* * * * *